Patented Mar. 22, 1938

2,111,981

UNITED STATES PATENT OFFICE 2,111,981

WATER COLORS

Friedrich Wilhelm Liebetruth, Nuremberg, Germany

No Drawing. Application September 25, 1935, Serial No. 42,081. In Germany August 15, 1935

2 Claims. (Cl. 134—28)

The known water color bodies which in the ready-for-use state are placed or fixed as quadrangular, round or otherwise shaped cakes in the compartments of color boxes or the insertions in such boxes are in the form of rolled, stamped or cast bodies of compact structure. The water absorbing capacity of these compact bodies is relatively small and consequently they are not easily wetted, when being worked up with the moist brush.

According to the invention water color bodies are made in the form of cakes having a porous structure throughout, which contain air spaces and have a closed surface. These completely porous color bodies have a considerably greater water-absorbing capacity than the color bodies and are therefore more readily wetted and quicker to work up.

It may occur, that, owing to being insufficiently dried through, cast water color cakes have a low porosity at their under side with which they are bedded or fixed in the color box or in the insertion therein. This lack of porosity, however, does not affect their usefulness, as in any case the cake will be one which is dense right through to the bottom surface, the wetting property of which is no greater than that of a rolled or stamped water color cake.

According to the invention in the manufacture of the water color bodies a loosening up of the structure is effected by the addition of a loosening-up agent and the surface of the porous body is closed by drying, more particularly by heating.

The method according to the invention is carried out for example as follows:

A castable color mass of a known kind is used, which consists of a pigment, a filler and binding agent which at the same time acts as an adhesive. The pigments in question are mineral colors and chemical colors, for instance soluble dyestuffs (aniline dyes) or insoluble so-called lake colors. Suitable fillers are for instance hydrate of aluminium, kaolin, calc-spar or prepared chalk. As the adhesive or binding agent gum arabic is used.

This color mass is poured, also in a known manner, in a fluid state into an open mould. The mould used is preferably the compartment or the insertion of the color box.

According to the invention a loosening-up agent is added to the pourable color mass. Such an agent is for instance ammonium bicarbonate (salt of hartshorn).

Thereupon the cast color mass is compacted in a manner known per se by drying in a drying chamber or a so-called drying box.

According to the invention the color mass containing the loosening-up agent is while drying compacted in such a manner that a color body is produced, which is porous or sponge-like in its whole structure and the surface of which closes so to form a thin, practically non-porous or smooth layer. The cast color mass is preferably heated while drying. The temperature to which it is heated depends on the nature of the loosening-up agent and, for instance when using ammonium bicarbonate, is about 60° C.

The product obtained by this process is a hard water color body which is porous throughout, having air spaces and a closed surface. When such color bodies are being used, the thin surface layer is immediately dissolved by the moist brush, whereupon the water given off by the brush penetrates into the porous structure of the color body and thereby readily transfers the color to the brush.

According to a modification of the invention the porous structure of the water color body is produced by the action of vacuum.

This does away with the necessity of adding a special loosening-up agent. Furthermore it becomes possible to influence the porosity of the product by regulating the effect of the vacuum, so that water color bodies with a structure of greater or less porosity can be produced.

In carrying out the process in this modified form of the invention the procedure is as follows:

The color mass composed of pigment, filler and adhesive or binding agent is placed in a fluid or viscous state in a drying oven, in which a vacuum is then produced and maintained during the whole of the drying process.

Through the action of the vacuum the color mass is loosened-up in its structure, so that according to the degree of vacuum formed in the drying chamber a greater or less degree of porosity of the color body, into which the drying color mass solidifies, is produced. The dry, porous color body has a closed surface which forms as the color mass is drying.

The time allowed for drying and for the vacuum to act may be varied according to the nature of the water colors and the desired degree of porosity. The vacuum employed may for instance amount to a column of mercury of 40 cm.

What I claim is:

1. A water color in the form of cakes comprising a body which has a sponge-like internal structure and a comparatively smooth outer surface.

2. A process for manufacturing water colors in cake form, which comprises preparing a fluid color mass, adding ammonium bicarbonate to the color mass, placing the color mass into a mold, and drying the color mass at a temperature sufficient to decompose the ammonium bicarbonate to impart to the internal part of the color mass a sponge-like structure and a comparatively smooth outer surface.

FRIEDRICH WILHELM LIEBETRUTH.